United States Patent
Blake et al.

(10) Patent No.: US 7,069,362 B2
(45) Date of Patent: Jun. 27, 2006

(54) TOPOLOGY FOR SHARED MEMORY COMPUTER SYSTEM

(75) Inventors: Michael A. Blake, Wappingers Falls, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 10/436,378

(22) Filed: May 12, 2003

(65) Prior Publication Data

US 2004/0230726 A1    Nov. 18, 2004

(51) Int. Cl.
    *G06F 13/00*    (2006.01)
(52) U.S. Cl. .................. 710/107; 710/300; 709/213
(58) Field of Classification Search ................ 710/100, 710/300–302, 305; 709/200, 212, 213, 218, 709/242, 2
    See application file for complete search history.

(56) References Cited

U.S. PATENT DOCUMENTS

| | | | |
|---|---|---|---|
| 4,434,463 A | 2/1984 | Quinquis et al. ........... 364/200 |
| 5,560,027 A | 9/1996 | Watson et al. ............. 395/800 |
| 5,974,487 A | 10/1999 | Hartmann .................... 710/100 |
| 6,112,283 A * | 8/2000 | Neiger et al. ............... 711/146 |
| 6,212,161 B1 * | 4/2001 | Regula ........................ 370/223 |
| 6,222,708 B1 * | 4/2001 | Severson et al. ............. 361/2 |
| 6,233,704 B1 | 5/2001 | Scott et al. ................. 714/717 |
| 6,244,881 B1 * | 6/2001 | Hara .......................... 439/188 |
| 6,253,292 B1 * | 6/2001 | Jhang et al. ................ 711/146 |
| 6,269,452 B1 * | 7/2001 | Daruwalla et al. ............ 714/4 |
| 2001/0029549 A1 * | 10/2001 | Delchini ..................... 709/251 |
| 2002/0091864 A1 * | 7/2002 | Van Raalte et al. ......... 709/251 |
| 2002/0194371 A1 * | 12/2002 | Kadoi ........................ 709/239 |
| 2003/0009599 A1 * | 1/2003 | Lee et al. ................... 709/251 |
| 2004/0230751 A1 * | 11/2004 | Blake et al. ................ 711/147 |
| 2004/0230752 A1 * | 11/2004 | Blake et al. ................ 711/147 |

* cited by examiner

*Primary Examiner*—Glenn A. Auve
(74) *Attorney, Agent, or Firm*—Lynn Augspurger; Cantor Colburn LLP (57) ABSTRACT

A dual ring topology for multiprocessing computer systems. The dual ring topology interconnects multiple building blocks (nodes) to each other, each node comprising processing elements, memory and IO devices. The topology allows for the dual rings to be temporarily transformed into a single ring structure while a node is added, repaired or replaced while the rest of the system continues to operate thereby allowing the remaining nodes in the system to remain fully connected to one another.

10 Claims, 8 Drawing Sheets

FIG. 1A
4 NODES

FIG. 1B
3 NODES

FIG. 1C
2 NODES

FIG. 1D
1 NODE

TOPOLOGY FOR SHARED MEMORY COMPUTER SYSTEM

CROSS REFERENCE TO RELATED APPLICATIONS

This application is related to U.S. patent application Ser. No. 10/435,776, entitled: COHERENCY MANAGEMENT FOR A "SWITCHLESS" DISTRIBUTED SHARED MEMORY COMPUTER SYSTEM, filed contemporaneously with this application.

This application is also related to U.S. patent application Ser. No. 10/435,878, entitled: BUS PROTOCOL FOR A "SWITCHLESS" DISTRIBUTED SHARED MEMORY COMPUTER SYSTEM, filed contemporaneously with this application.

These co-pending applications and the present application are owned by one and the same assignee, International Business Machines Corporation of Armonk, N.Y.

The descriptions set forth in these co-pending applications are hereby incorporated into the present application by this reference thereto.

Trademarks: IBM ® is a registered trademark of International Business Machines Corporation, Armonk, N.Y., U.S.A. S/390, Z900 and z990 and other product names may be registered trademarks or product names of International Business Machines Corporation or other companies.

TECHNICAL FIELD

This present application relates to large shared-memory symmetrical multiprocessing computer systems built from multiple building blocks, henceforth referred to as "nodes", each of which contains some amount of memory and some number of processing units. More particularly the present application is related to the use of a topology for interconnecting these multiple nodes that allows for both high overall system performance and availability.

BACKGROUND

The continued demand for high performance computers and/or computer systems requires optimum usage of the available hardware and software. One such approach is the implementation of the use of processing nodes each comprising one or more microprocessors and memories. These computer systems are sometimes referred to shared multi-processor systems. In a shared multiprocessing computer system, the nodes are interconnected to each other so that they can communicate with each other, share operating systems, resources, data, memory etc.

One of the goals of building a modern computing machine employed at the Enterprise level is to: have enough system capacity to take the many different workloads and applications running in a distributed computing environment, such as a server farm, and move them onto a large highly available monolithic host server, which is still operable or available while maintenance or capacity upgrade is being performed on the host server.

The benefit of consolidating workloads and applications from many small machines to a larger single one is financially motivated to reduce the number of system operators, amount of floorspace and system maintenance costs. However, the risk associated with such a consolidation is when an unplanned system outage occurs and the entire processing center could possibly be shut down. Up until now, system integration vendors have focused mainly on pushing the symmetric multiprocessor computer system (SMP) size envelop, integrating up to 64 or more processors in a tightly coupled shared memory system in a variety of coherent inter-processor connect topologies. The commonly available designs in the Unix platform include topologies where integrated processor-memory nodes, or simply nodes, are interconnected by means of multiple parallel common directional loops with distributed switch network (topology A), Central crossbar switch (topology B), or tree-based hierarchical switch (topology C). All of the above-mentioned topologies can be built to achieve the large scalability goal of a modern computing machine, but do not completely achieve the system availability goal in terms of dynamically replacing or repairing a hardware component while the rest of the system continues to operate.

Should any failing hardware component need to be replaced on any of the 3 topologies mentioned above the system would be either severely degraded or rendered inoperable. For example, a failing node anywhere on topology A would prohibit inter-processor communication from being maintained amongst the remaining nodes. On topology B shutting down and replacing the central crossbar switch would essentially bring down all inter-processor communication between nodes. Even if a parallel central crossbar switch were to be added as a fail-over network the practicality of such a design would make it impractical to package the crossbar switches anywhere else except on the backplane where the nodes are plugged into, thereby shutting down and replacing a switch component would require the replacement of the backplane which would have the effect of losing all node to node communication. If the failing node on topology C is at the apex of the tree network, inter-processor communication would not be possible between branches beneath the apex node. A fourth possible topology would be a fully connected star-based scheme with all nodes connecting directly to each other. While this topology would be ideal for dynamic node replacement the main drawbacks are the limited bus bandwidth on configurations with few number of nodes, and the high latency frequency limited noise susceptible long wiring nets needed for a fully connected topology.

Accordingly, it is desirable to have a shared multiprocessing computer system wherein critical hardware components can be substituted out for maintenance purposes while remaining components continue to operate and thereby virtually eliminating system downtime due to planned outages for servicing of hardware.

SUMMARY

An exemplary embodiment features a system topology whereby critical hardware components can be substituted out for maintenance purposes while remaining components continue to operate and thereby virtually eliminating system downtime due to planned outages for servicing of hardware. The topology is comprised of multiple Central Processors, Main Memory and the system switch network distributed across as many pluggable nodes as desired. Interconnecting the nodes together is a pair of coherent ring buses flowing in opposite direction providing to each node redundant paths for inter-processor communication.

The inter-processor communication flow in the topology of an exemplary embodiment can occur on either of the 2 rings or on both. System Coherency traffic, or snoop addresses, generally need to be broadcast to all other nodes and in an exemplary embodiment snoop addresses are broadcast on both rings simultaneously to reduce data intervention latency times. However, storage data would only need to traverse on one of the rings.

In an exemplary embodiment, the nodes are normally interconnected with the 2 rings fully intact, or closed, in order to provide maximum data bandwidth and best access latency performance. The rings are subsequently opened up for concurrent maintenance, and then re-closed upon completion of a node substitution. During concurrent maintenance, the 2 opened rings are dynamically bridged on the nodes with the severed connection to form one unidirection ring to provide a pathway for inter-processor communication to reach all the nodes. On system configurations requiring fewer nodes than there are slots on the backplane, wherein passive jumper cards are used to achieve closure on both rings to maintain the preferred system topology.

In addition, and in accordance with an exemplary embodiment, a capability is provided to upgrade system capacity either by dynamically inserting a processor-memory node in a slot that was occupied by a jumper card, or replace an existing processor-memory node with a node having more processors and/or memory.

These and other improvements are set forth in the following detailed description.

DESCRIPTION OF THE DRAWINGS

The detailed description explains exemplary embodiments of the invention, together with advantages and features, by way of example with reference to the drawings.

DETAILED DESCRIPTION

In accordance with an exemplary embodiment, a system topology is provided wherein inter node communication occurs on two rings each flowing in opposite directions with respect to each other. In one mode of operation the two rings provide multiple paths for inter node communication, that can be based upon the shortest path to the desired node while data flows on only one of the rings. In another mode of operation the two rings are latched to each other on at least two nodes transforming the 2 rings into a single ring. During this mode of operation critical hardware components can be substituted out for maintenance purposes while remaining components continue to operate and thereby virtually eliminating system downtime due to planned outages for servicing of hardware.

The topology is comprised of multiple central processors, main memory and a system switch network distributed across as many pluggable nodes as desired. Interconnecting the nodes together is a pair of coherent ring buses flowing in opposite direction providing to each node redundant paths for inter-processor communication.

The inter-processor communication flow in the disclosed topology can occur on either of the 2 rings or on both. System Coherency traffic, or snoop addresses, generally need to be broadcast to all other nodes and in an exemplary embodiment snoop addresses are broadcast on both rings simultaneously to reduce data intervention latency times. However, storage data would only need to traverse on one of the rings.

In an exemplary embodiment, the nodes are normally interconnected with the 2 rings fully intact, or closed, in order to provide maximum data bandwidth and best access latency performance. The rings are subsequently opened up for concurrent maintenance, and then re-closed upon completion of a node substitution. During concurrent maintenance, the 2 opened rings are dynamically bridged on the nodes with the severed connection to form one unidirection ring to provide a pathway for inter-processor communication to reach all the nodes. On system configurations requiring fewer nodes than there are slots on the backplane, wherein passive jumper cards are used to achieve closure on both rings to maintain the preferred system topology.

The disclosed topology in addition provides capability to upgrade system capacity either by dynamically inserting a processor-memory node in a slot that was occupied by a jumper card, or replace an existing processor-memory node with a node having more processors and/or memory.

There are many possible methods of interconnecting nodes together in large shared-memory multiprocessing computer systems as described in the Background section of this application.

Inter-processor communications transferred across the interconnect network typically consists of, but are not limited to, a System Coherent Addresses and Data Storage Unit units. A common sequence employed to determine whether data needs to be transferred on the interconnect network consists of one node, henceforth referred to as the requesting node or local node, broadcasting a System Coherent Snoop Address to all the other nodes in the system, henceforth referred to as the remote nodes.

Each remote node performs a snoop operation to determine whether the data associated with this address exists in it's node and forwards one or more responses back on to the interconnect network. If a remote node determines it is required to source the data, it also forwards the data on the interconnect network for eventual receipt and use by the requesting node.

Figure 1A:
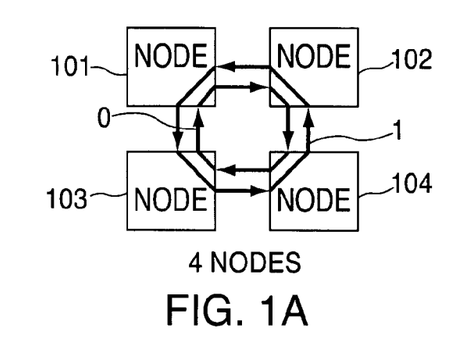
FIG. 1a illustrates a system configuration consisting of four nodes, each of which contains Central Processors, and Main memory. The Dual Concentric Ring topology described in this application is highlighted as the method chosen to interconnect these nodes. Inter-processor communications that typically flow across the buses comprising the interconnect are System Coherent Addresses and Storage Data units.

Referring now to FIG. 1a and in accordance with an exemplary embodiment, a Dual Concentric Ring topology is used to interconnect four nodes. Note that this same topology is not limited to interconnecting four nodes or fewer or greater, but rather can be used for a system comprising any number of nodes. Node 101 is directly connected via unidirection buses to two other nodes 102 and 103 in the systems. Nodes 102 and 103 are in turn each connected to Node 104 completing 2 separate rings running in opposite directions as illustrated by the arrows in FIG. 1a. In accordance with an exemplary embodiment, portions of the unidirection buses are disposed within a passive backplane.

Since each node connects directly to some of the other nodes without having to go through an external switch element, the processor-memory node then becomes the only pluggable component with switching silicon devices. A passive backplane with only embedded copper wiring for the ring buses is far less prone to fail than a backplane with active switching silicon devices and therefore is not considered as a critical component.

With emerging high speed wiring technology, such as optical cabling, becoming essential in future system designs it can be employed in this invention to replace the passive backplane and the copper wires to connect nodes together. Furthermore optical cables provide connection flexibility by allowing the rings to be closed in configurations with partial number of plugged nodes without the need for jumper cards. Accordingly, the use of conventional embedded copper wiring, and as stated previously is presumed to extend to include different wiring technologies such but not limited to optical cabling.

Figure 1B:
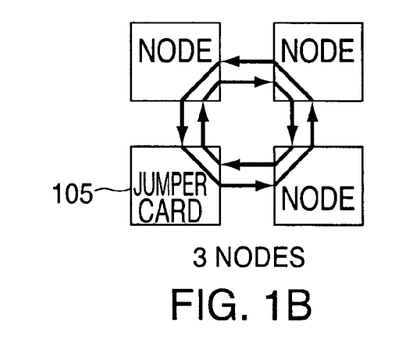
FIG. 1b illustrates a system configuration consisting of three nodes, each of which contains Central Processors, and Main memory, as well as a jumper card which is described in the Detailed Description section below. The Dual Concentric Ring topology described in this application is highlighted as the method chosen to interconnect these nodes.
Figure 1C:
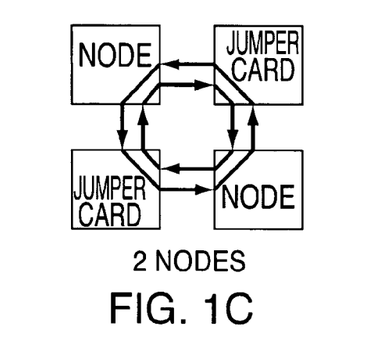
FIG. 1c illustrates a system configuration consisting of two nodes, each of which contains Central Processors, and Main memory, as well as two jumper cards which are described in the Detailed Description section below. The Dual Concentric Ring topology described in this application is highlighted as the method chosen to interconnect these nodes.
Figure 1D:
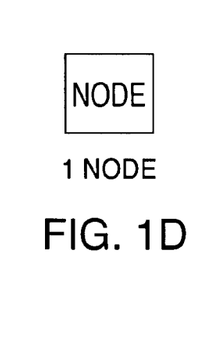
FIG. 1d illustrates a system configuration consisting of a single node, which contains Central Processors, and Main memory.

The clockwise ring in the drawing is henceforth referred to as Ring 0 while the counterclockwise ring in the drawing is henceforth referred to as Ring 1. FIG. 1b shows how this invention can be used to interconnect 3 nodes using the same backplane as utilized in 4 node systems. In this embodiment a jumper card 105 is used in place of the missing fourth node to electrically bridge the two sets of embedded wires on the backplane in order to maintain the flow of data through Ring 0 and Ring 1.

Figure 4:
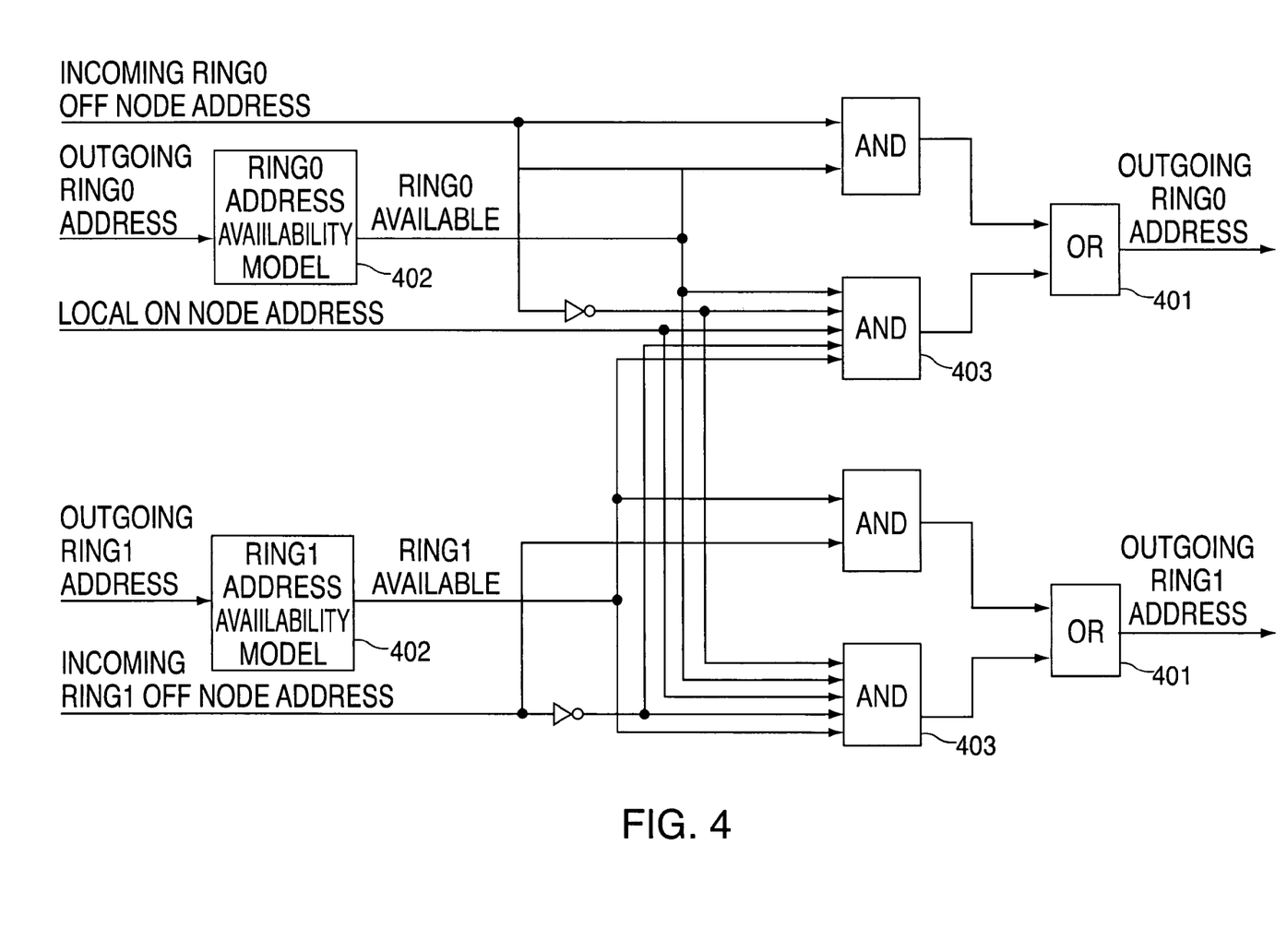
FIG. 4 illustrates the hardware components required on each node to broadcast Addresses to other nodes in a system utilizing an exemplary embodiment.

FIG. 4 shows the hardware components that need to be present on each node to implement broadcasting snoop addresses in a system utilizing the topology of an exemplary embodiment. When a fetch operation initiated by a processor does not exist in the local node's cache hierarchy in the correct ownership state, the address must be sent to all other nodes to search their caches to determine the cache ownership state on these remote nodes.

In systems utilizing ring or hierarchical interconnect topologies, each node must be able to broadcast a locally initiated snoop address or forward a snoop address that originated on a remote node. This is shown by the boxes labeled 401.

In accordance with an exemplary embodiment remote snoop addresses flow through the node on the same ring they arrive (i.e., snoop addresses that arrive on the incoming Ring 0 bus are forwarded on the outgoing Ring 0 bus, while snoop addresses that arrive on the incoming Ring 1 bus are forwarded on the outgoing Ring 1 bus), with no interlocks between the 2 rings. The only condition checked before forwarding the remote snoop address is the outgoing Ring Address bus availability which is determined by the use of a Ring Address Bus Availability model 402. Since some bus operations may busy the Ring Address Bus for more than one system machine cycle, the Availability model is needed to keep track of which machine cycles the bus will be busy due to operations that have already been granted the use of the bus. The Availability model contains a number of registers each containing information about the use of the bus in a given system machine cycle, with the number of registers determined by the maximum number of cycles an operation may busy the bus. Before a new operation is granted use of this bus, a check is performed to make sure it does not require the bus in a machine cycle that has already been reserved by an earlier operation.

In accordance with an exemplary embodiment local snoop addresses are allowed to be launched on both rings simultaneously in order to expedite the snoops thereby minimizing off-node access times, while data is only flowing on one or the other ring. If this is implemented, availability of both rings must be checked before launching the address on either ring as shown in box 403. In addition, outstanding remote snoop addresses are given higher priority than pending local snoop addresses so a check must be performed to make sure there are no remote snoop addresses waiting to be forwarded on either ring as also shown in box 403.

Figure 5:
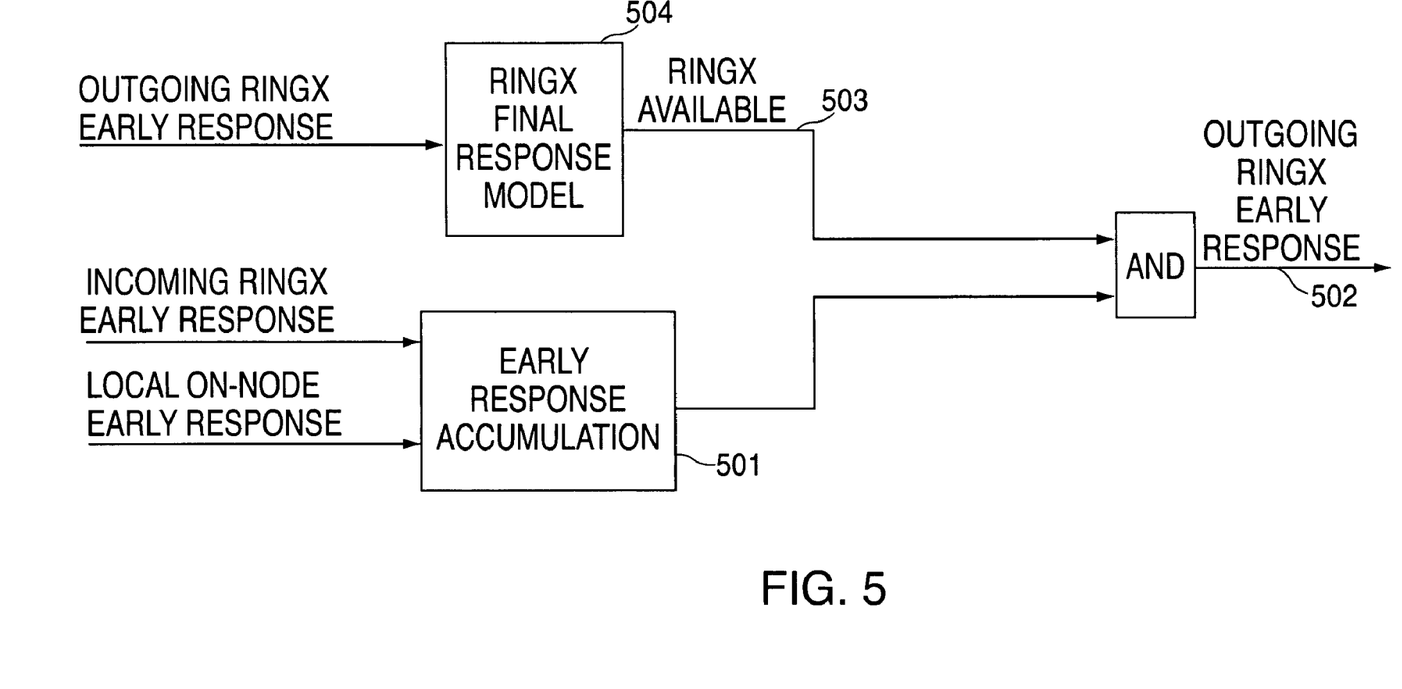
FIG. 5 illustrates the hardware components required on each node to broadcast Early Responses to other nodes in an exemplary embodiment. Early Responses are defined in the Detailed Description section below.

FIG. 5 shows the hardware components that need to be present on each node to implement broadcasting early responses in a system utilizing an exemplary embodiment of this invention. As is known in the related arts early responses are partial answers to requests that are broadcast across a system such as multiprocessing computer system and final responses are the complete response (e.g., answers from all components receiving the broadcast request or snoop). The Early response is a subset of the Final Response and is either the response from a node or subset of all the nodes. As each node performs its snoop, it must compare it's locally generated Early Response with the incoming Early Response it received over a ring as shown in box 501 and forward the result on the outgoing Early Response bus 502 that is part of the same ring. Note the key difference between Early Responses and Final Responses is that Early Responses only contain status from snoops performed by nodes that have already received a copy of the snoop address on a given ring while Final Responses contain status regarding snoops performed by all nodes in the system. The process of comparing the local and incoming responses and determining which response to forward is referred to as response accumulation 501. The only condition that is checked before forwarding this accumulated response is the Ring Early Response Bus Availability 503 through the use of a Ring Early Response Bus Availability model 504. Since some bus operations may busy the Early Response Bus for more than one system machine cycle, an Availability model similar to the Ring Address Bus Availability model described earlier is employed to make sure an operation is not granted the use of the Ring Early Response bus which conflicts with an operation that was previously granted use of the same bus. The two Early Response rings operate completely independently of one another.

Figure 6:
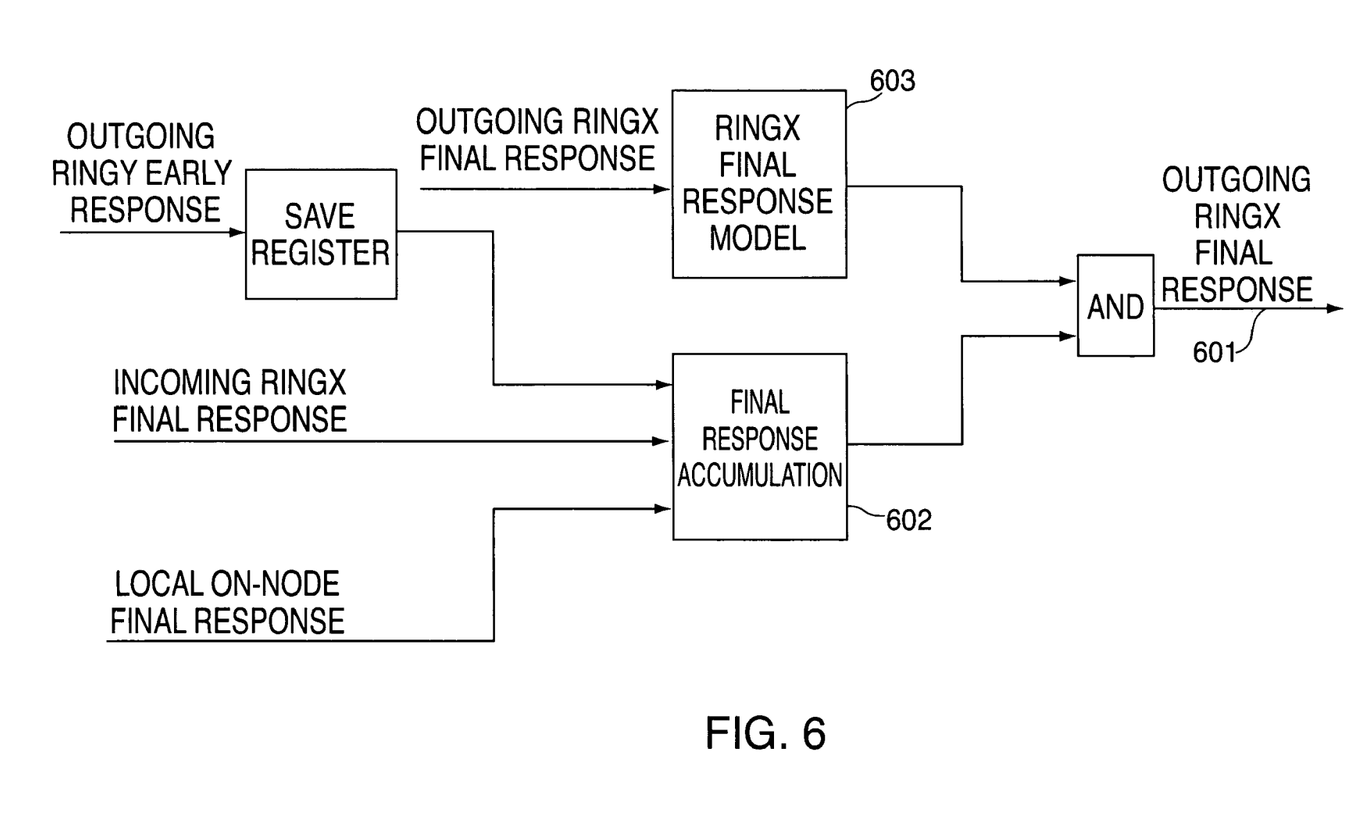
FIG. 6 illustrates the hardware components required on each node to broadcast Final Responses to other nodes in a system utilizing an exemplary embodiment. Final Responses are defined in the Detailed Description section below.

FIG. 6 shows the hardware components that need to be present on each node to implement broadcasting final responses in a system utilizing the topology of an exemplary embodiment. The Final response is used to indicate to all the nodes whether the address was successfully processed in the system, including any required cache state updates and data sourcing. As each node completes all required actions based on its local snoop and incoming Early responses, it must first compare its own locally generated Final response with the incoming Final Response on a ring as well as a copy of the Early Response it previously forwarded on the other ring before forwarding an outgoing Final Response 601 on a ring. The process of comparing these responses is referred to as Final Response Accumulation and is shown in box 602. The only condition that is checked before forwarding this merged final response is the Ring Final Response bus availability which is determined by use of a Ring Final Response Bus Availability model 603. Since some bus operations may busy the Final Response Bus for more than one system machine cycle, an Availability model similar to the Ring Address Bus Availability model described earlier is employed to make sure an operation is not granted the use of the Ring Final Response bus that conflicts with an operation that was previously granted use of the same bus.

Figure 7:
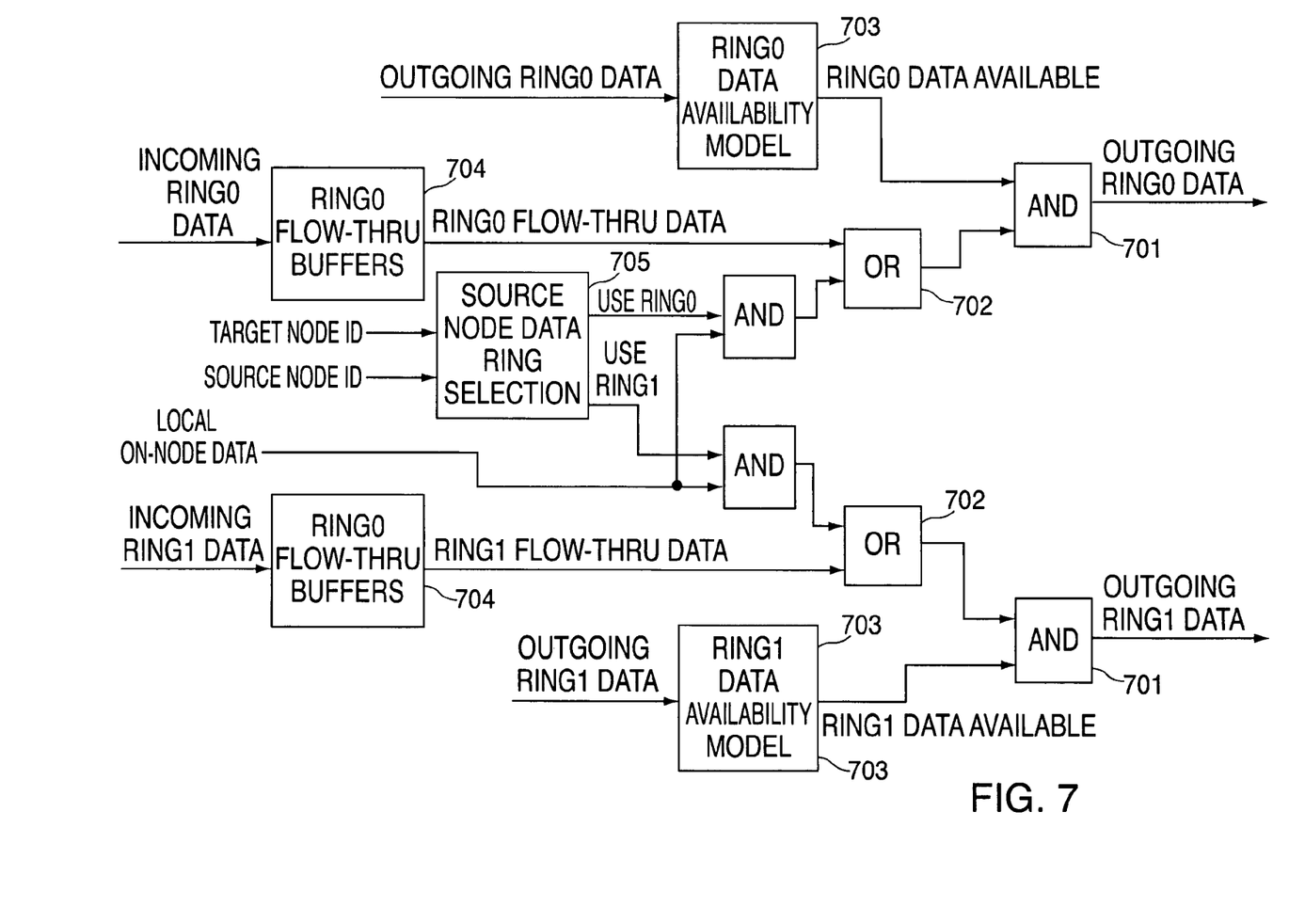
FIG. 7 illustrates the hardware components required on each node to transmit data from one node to another node in an exemplary embodiment.

FIG. 7 shows the hardware components that need to be present on each node to support transmitting data from one node, henceforth referred to as the "source" node to another node, henceforth referred to as the "target" node. By it's nature, the dual ring topology offers two possible different paths, one per ring, to move the data. The source node is responsible for making the selection of which ring to use, with the first choice being the ring which provides a direct connection between the source and destination nodes to minimize the latency required to move the data. If no such ring exists, then the source node attempts to choose the ring with the fewest number of other nodes, henceforth referred to as intermediate nodes, between the source and target nodes, once again to minimize the latency required to move the data. If the number of intermediate nodes are equal for the 2 possible ring paths, then each source node employs an algorithm to attempt to use each ring 50 percent for the same target node. An example of a possible algorithm used is to use Ring 0 when one of the request address bits is zero and to use Ring 1 when one of the request address bits is one. This is done to try to optimize the use of the total system data bus bandwidth, and reduce the frequency of data being stalled on a node waiting for a particular ring data bus to become available.

The source node data ring selection logic is represented by box 705 and is used to steer the local on-node data to either the outgoing Ring 0 or Ring 1 Data bus. For intermediate nodes, Incoming ring data is captured in one or more Ring Flow-Through buffers 704 that are dedicated for each ring. Boxes 702 show a selection between a given ring's flow-through data and the local on-node data that has been steered to that ring. The ring flow-through data is given higher priority to minimize the number of Flow-through Buffers required to be built.

Prior to routing the data selected to a given Outgoing Ring data bus, a check is performed to make sure the Outgoing Ring data bus is available, as illustrated in boxes 701. Since some bus operations may busy the Data Bus for more than one system machine cycle, an Availability model similar to the Ring Address Bus Availability model described earlier is employed to make sure an operation is not granted the use of the Data bus which conflicts with an operation that was previously granted use of the same bus.

One of the key advantages of an exemplary embodiment of the present invention compared to other methods of interconnecting nodes in a large shared-memory multiprocessing computer system is its support for concurrent repair, e.g., the ability to replace a bad node in the system while the other nodes continue to process normal workloads, and for concurrent upgrade, e.g., the ability to add a new node to the system to upgrade its total capacity while the other nodes continue to process normal workloads with degraded system resources.

The hardware reconfiguration steps required to perform concurrent node repair are illustrated in FIG. 2. FIG. 2a shows a 4 node system connected normally via the topology of an exemplary embodiment. Repairing an existing bad node 201 is accomplished by replacing this bad node with a new spare node. FIG. 2b shows the first hardware step required which is to electrically reconfigure the routing of the ring buses on the two nodes 202 and 203 logically adjacent to the failing node. On Node 202, instead of the Ring 0 input buses continuing to be electrically routed to the Ring 0 output buses, they are routed to the Ring 1 output buses, with the Ring 1 input buses and the Ring 0 output buses no longer used on this node. On Node 203, instead of the Ring 1 input buses continuing to be electrically routed to the Ring 1 output buses, they are routed to the Ring 0 output buses, with the Ring 0 input buses and the Ring 1 output buses no longer used on this node.

Figure 2A:
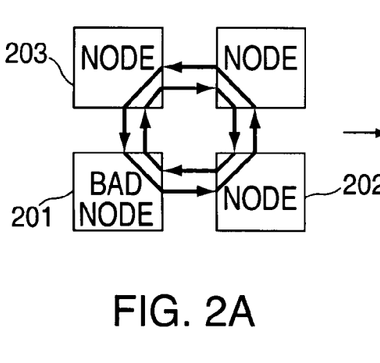
FIG. 2 illustrates the hardware re-configuration required in order to concurrently repair a bad node, while the system continues to process normal workloads with degraded system resources.
Figure 2B:
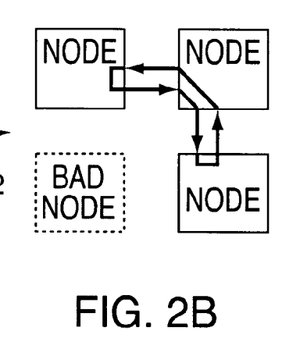
Figure 2C:
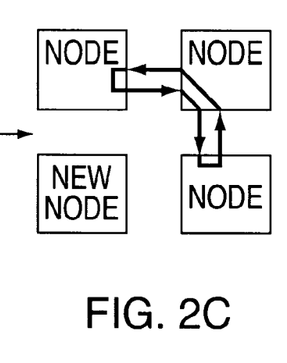
Figure 2D:
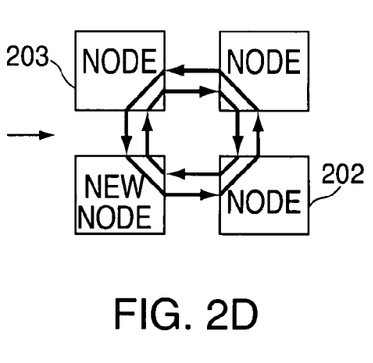
Figure 3A:
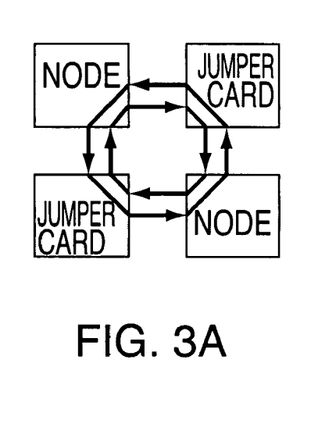
FIG. 3 illustrates the hardware re-configuration required in order to upgrade a two node configuration to a three node configuration while the system continues to process normal workloads with degraded system resources.
Figure 3B:
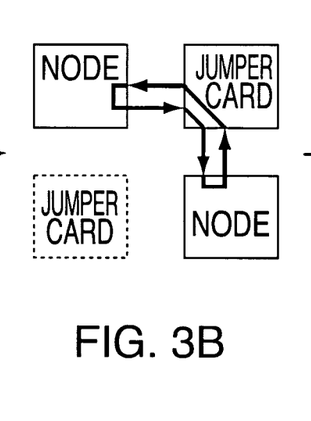
Figure 3C:
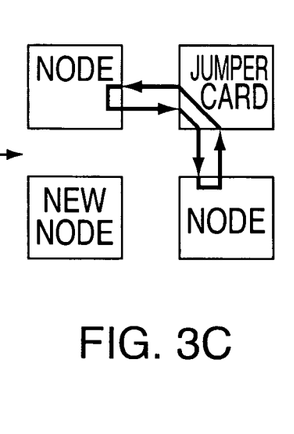
Figure 3D:
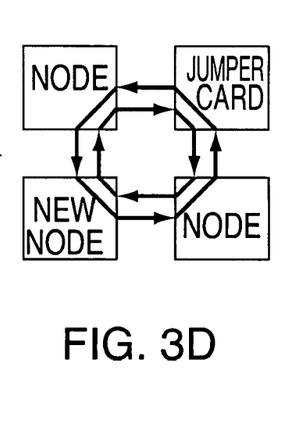

Looking at FIG. 2b, one can observe that the "good" nodes in the system are thus connected in a single ring arrangement, using a combination of the Ring 0 and Ring 1 buses, while the bad node is no longer connected to any of the other nodes in the system. The next step in the sequence is shown in FIG. 2c and consists of powering down the bad node and removing it from the system backplane and inserting and powering up a new good node in its place. Note the other nodes in the system continue to operate normally with the only difference being they are connected via a single ring topology instead of a dual ring topology. The final hardware step in the sequence is shown in FIG. 2d and consists of including the new node in the system by converting the single ring interconnect topology back to the dual ring interconnect topology.

On node 202, the Ring 0 input buses are electrically reconnected to the Ring 0 output buses instead of the Ring 1 output buses, while on node 203, the Ring 1 input buses are electrically reconnected to the Ring 1 output bus instead of the Ring 0 output buses. The hardware required to electrically switch connecting Ring input buses from one set of Ring output buses is shown in FIG. 8 and is described below.

The hardware reconfiguration steps required to perform concurrent node upgrade are illustrated in FIG. 3. FIG. 3a shows a system consisting of 2 active Nodes and 2 jumper card plugged into a backplane that has been wired to support 4 active nodes. If more total system capacity is needed, the system can be upgraded to a 3 Node system by replacing one of the jumper cards with a new node. The hardware sequence is identical to the concurrent node repair sequence described above with the only difference being that instead of replacing a 'bad' node with a new good node, the jumper card is replaced. If even more system capacity is required, the system can be upgraded to 4 nodes by replacing the remaining jumper card using the same sequence of hardware actions.

Figure 8:
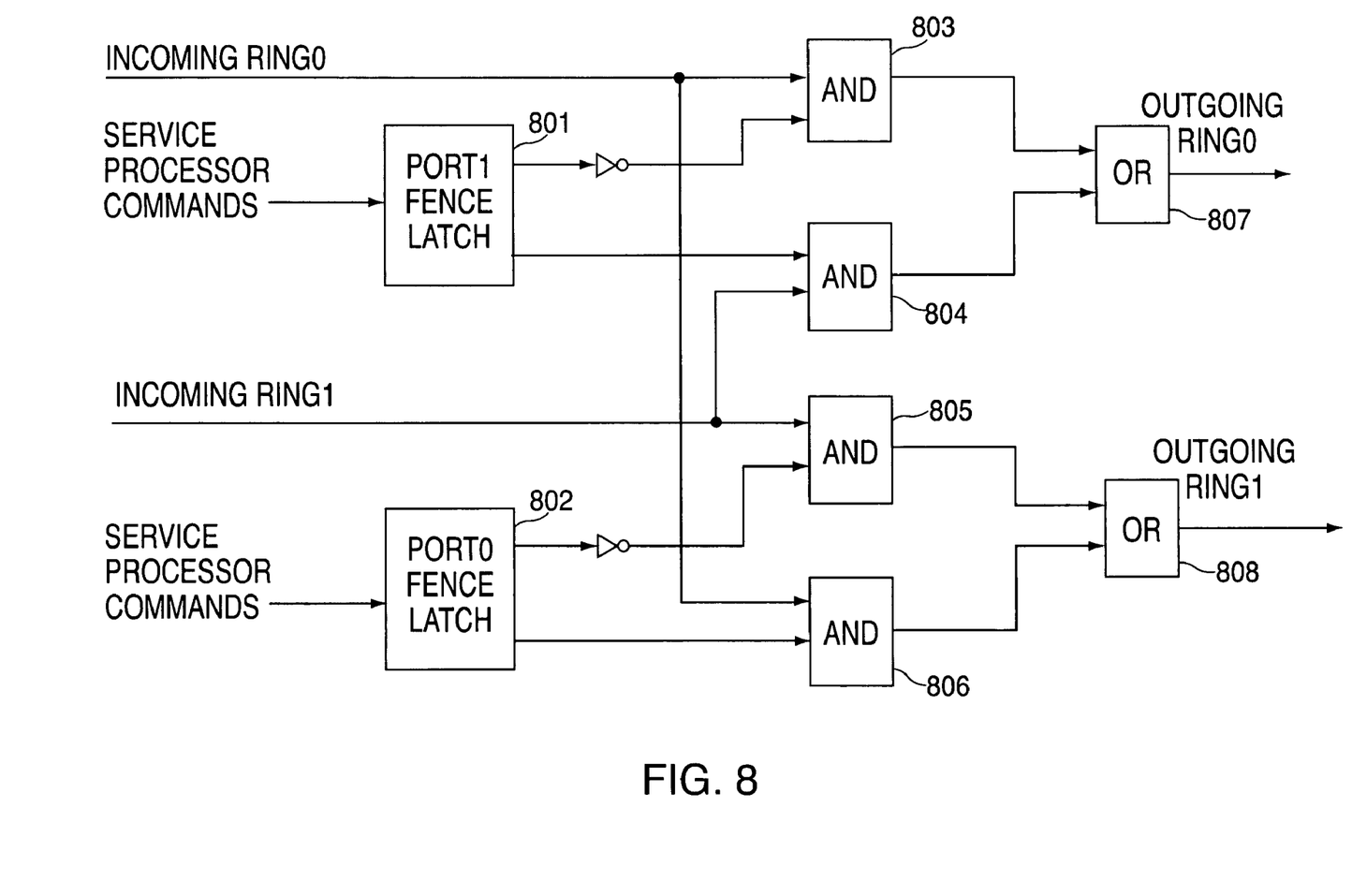
FIG. 8 illustrates the hardware components required on each node to perform the hardware re-configuration steps required to perform concurrent node repair and upgrade. These components are needed to change the routing for communication such as addresses, responses, and data from one Ring output bus to the other Ring output bus.

FIG. 8 shows the hardware required on each node to electrically reconfigure the Ring Input and Output buses on each node such that the system interconnect can be switched back and forth from a Dual-Ring topology to a Single-Ring topology as required. The key hardware elements required are the Port 1 Fence latch 801 and the Port 0 Fence latch 802.

The Port 1 Fence latch 801 is set by commands from the service processor by way of a J-Tag or equivalent interface and is active when the node normally directly connected to the Ring 0 output and Ring 1 input buses is not active or present in the system. As can be seen in FIG. 8, when this latch is active the Incoming Ring 0 buses are routed through boxes 806 and 808 to the Outgoing Ring 1 buses.

When this latch is not active this signifies that the node normally directly to the Ring 0 output and Ring 1 input buses is active in the system. In this case, the Incoming Ring 0 buses are routed as per the normal arrangement to the Outgoing Ring 0 buses through boxes 803 and 807.

The Port 0 Fence latch 802 is set by commands from the service processor by way of a J-Tag or equivalent interface and is active when the remote node normally directly connected to the Ring 1 output and Ring 0 input buses is not active or present in the system. As can be seen in FIG. 8, when this latch is active the Incoming Ring 1 buses are routed through boxes 804 and 807 to the Outgoing Ring 0 buses.

When this latch is not active this signifies that the remote node normally directly to the Ring 1 output and Ring 0 input buses is active in the system. In this case, the Incoming Ring 1 buses are routed as per the normal arrangement to the Outgoing Ring 1 buses through boxes 805 and 808.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring;
wherein said coupling provides interprocessor communication among at least two of said plurality of nodes by allowing data of said first ring to reach said second ring;
wherein data in said first ring flows in opposite directions with respect to said second ring;
wherein each of said plurality of nodes further comprises hardware for broadcasting snoop addresses on said first ring and said second ring simultaneously;
wherein each of said plurality of nodes further comprises hardware for forwarding an incoming snoop addresses on the same ring that said incoming snoop address was received on;
wherein each of said plurality of nodes further comprises an address bus availability model to determine when a snoop addresses can be broadcast to one of said plurality of nodes that has not received said snoop address being broadcast.

2. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
am output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring;
wherein each of said plurality of nodes further comprises hardware for broadcasting snoop addresses on said first ring and said second ring simultaneously;
wherein each of said plurality of nodes further comprises hardware for forwarding an incoming snoop addresses on tho same ring that said incoming snoop address was received on;
wherein each of said plurality of nodes further comprises a data availability model to determine when data can be broadcast to one of said plurality of nodes on the same ring said data is received.

3. A processing system, comprising:
a first ring and a second ring interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes allowing data of said first ring to reach said second ring;
wherein data in said first ring flows in opposite directions with respect to said second ring;
further comprising means for accumulating an incoming ring early response and a local on-node early response on each of said plurality of nodes prior to broadcasting said early response on either said first ring or said second ring.

4. A processing system, comprising:
a first ring end a second ring for interconnecting a plurality of nodes, each of said plurality of nodes comprising;
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring;
further comprising means for using an early response availability model on each of said plurality of nodes to determine when early responses can be broadcast on either said first ring or said second ring.

5. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring
further comprising means for accumulating an incoming ring final response, a local on-node final response, and an outgoing early response on each of said plurality of nodes prior to broadcasting said final response on either said first ring or said second ring.

6. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring;
further comprising means for using a final response availability model on each of said plurality of nodes to determine when final responses can be broadcast on either said first ring or said second ring.

7. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring;
further comprises means for selecting either said first ring or said second ring when moving data from a source node of said plurality of nodes to a target node of said plurality of nodes, wherein the selecting is based upon the proximity of said source node and said target node on said first ring and said second ring.

8. A processing system, comprising:
a first ring and a second ring for interconnecting a plurality of nodes, each of said plurality of nodes comprising:
at least one processor;
memory;
an input bus for said first ring;
an input bus for said second ring;
an output bus for said first ring;
an output bus for said second ring; and
a device for coupling said input bus of said first ring to said output bus of said second ring or said input bus of said second ring to said output bus of said first ring,
wherein said coupling provides interprocessor communication among at least two of said plurality of nodes by allowing data of said first ring to reach said second ring;
wherein data in said first ring flows in opposite directions with respect to said second ring;
further comprising means for using an address-based scheme for selecting either said first ring or said second ring when moving data from a source node of said plurality of nodes to a target node of said plurality of nodes when said source node is equidistant on each of said first ring or said second ring.

9. The processing system as in claim 8, further comprising means for using flow-through buffers to temporarily save data as it is being routed through one of said plurality of nodes and said one of said plurality of nodes is neither said source node or said target node with respect to said data being routed and temporarily saved.

10. The processing system as in claim 9, further comprising a selecting means for selecting data to be broadcast on a ring output bus of one of said plurality of nodes, said selected data being either data being held in said flow-through buffer or data being sourced from said source node wherein said data being held in said flow-through buffer is given higher priority.

* * * * *